M. S. TOWSON AND C. E. COCHRAN.
INDUSTRIAL TRUCK.
APPLICATION FILED MAR. 10, 1919.
1,337,804. Patented Apr. 20, 1920.
3 SHEETS—SHEET 1.
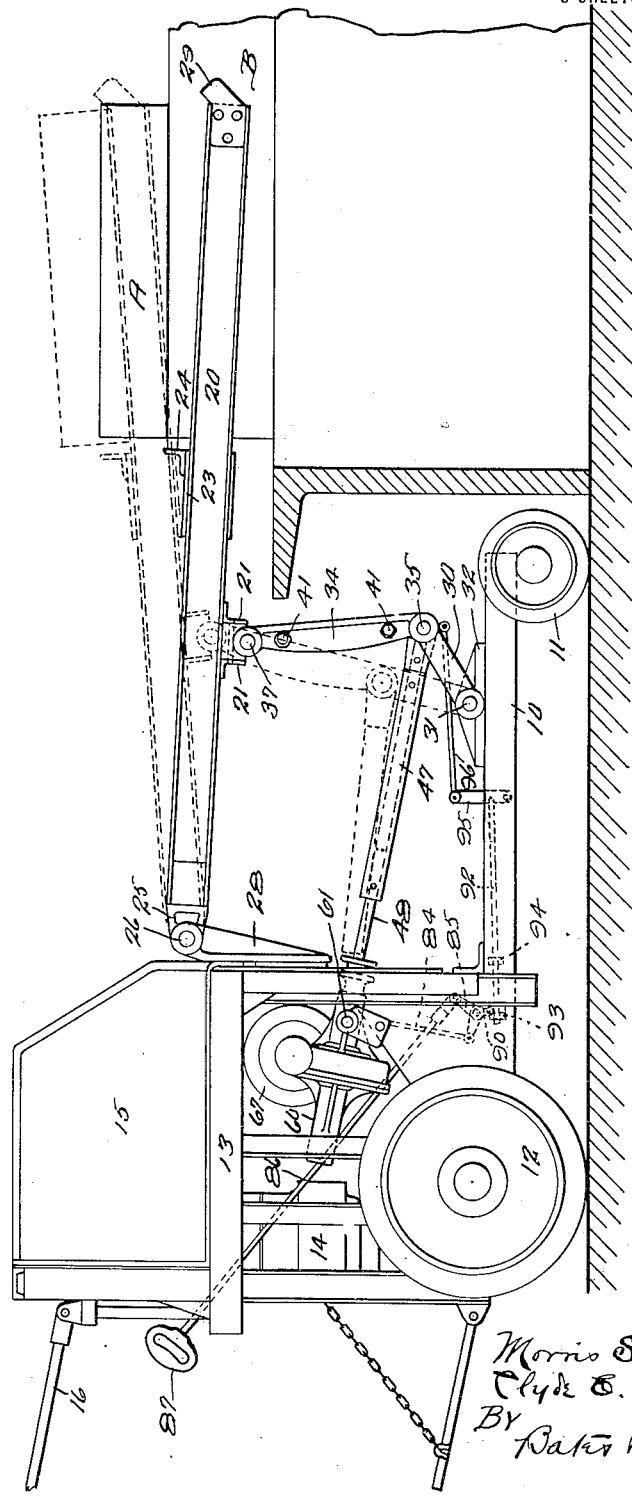
Inventors
Morris S. Towson,
Clyde E. Cochran,
By Baker Macklin,
Attys.

M. S. TOWSON AND C. E. COCHRAN.
INDUSTRIAL TRUCK.
APPLICATION FILED MAR. 10, 1919.
1,337,804.
Patented Apr. 20, 1920.
3 SHEETS—SHEET 2.
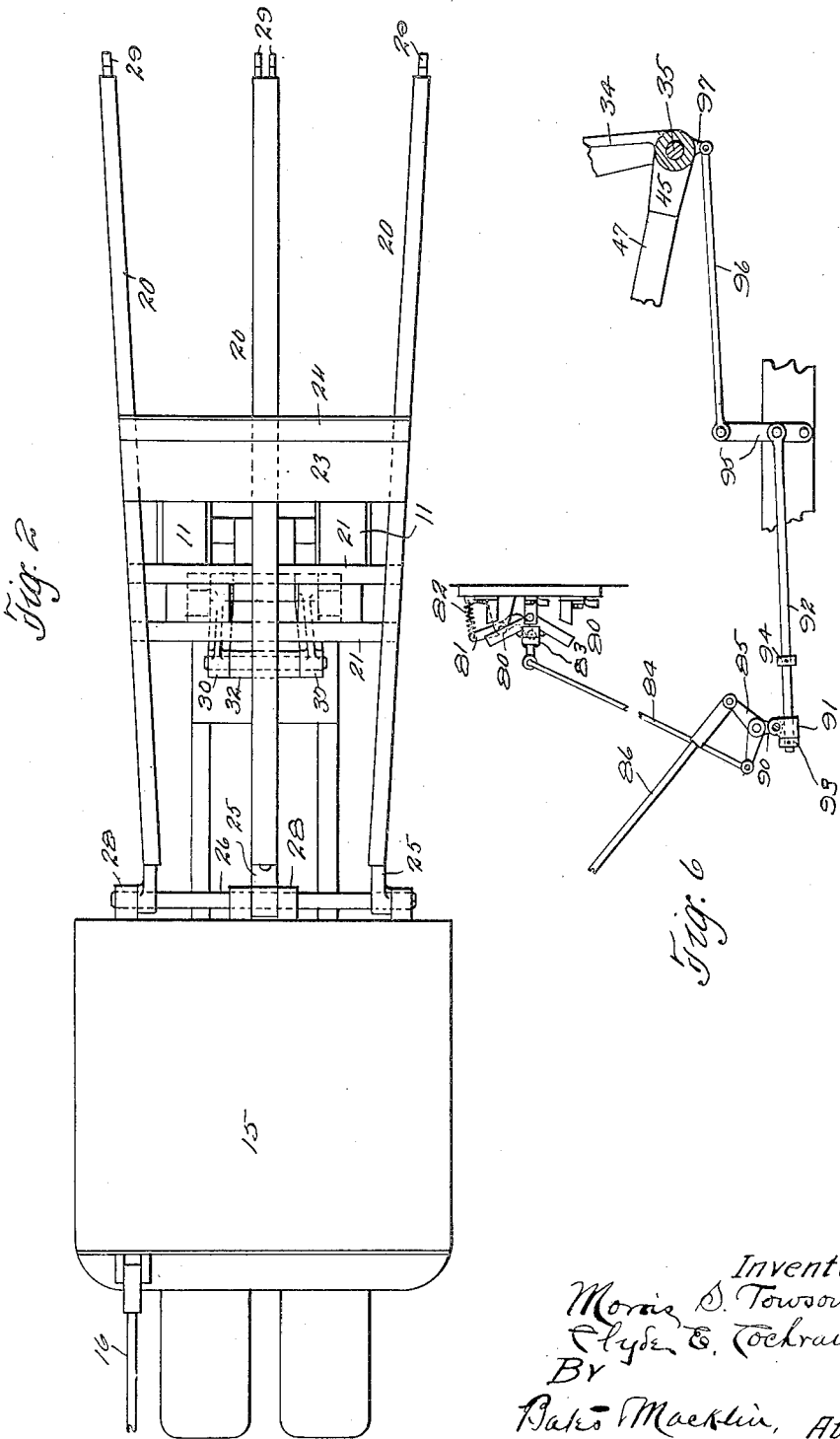

M. S. TOWSON AND C. E. COCHRAN.
INDUSTRIAL TRUCK.
APPLICATION FILED MAR. 10, 1919.
1,337,804. Patented Apr. 20, 1920.
3 SHEETS—SHEET 3.
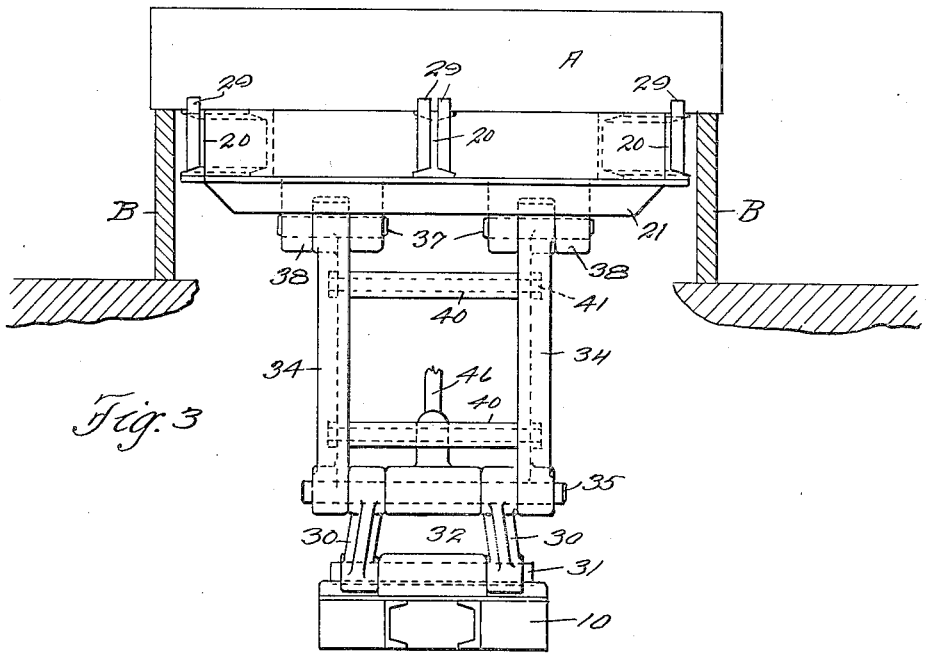
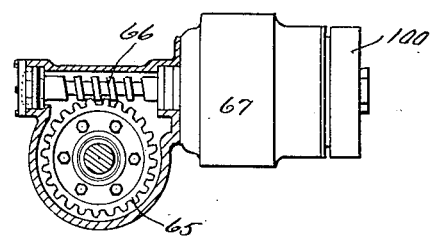
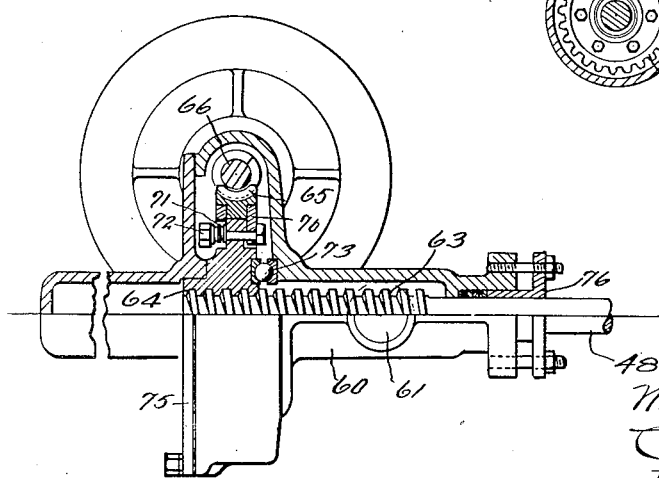
Inventors
Morris S. Towson,
Clyde E. Cochran,
By Baker & Macklin,
Attys.

UNITED STATES PATENT OFFICE.

MORRIS S. TOWSON AND CLYDE E. COCHRAN, OF CLEVELAND, OHIO.

INDUSTRIAL TRUCK.

1,337,804.   Specification of Letters Patent.   Patented Apr. 20, 1920.

Application filed March 10, 1919. Serial No. 281,773.

*To all whom it may concern:*

Be it known that we, MORRIS S. TOWSON and CLYDE E. COCHRAN, citizens of the United States, residing at Cleveland, in the county of Cuyahoga and State of Ohio, have invented a certain new and useful Improvement in Industrial Trucks, of which the following is a full, clear, and exact description, reference being had to the accompanying drawings.

The object of this invention is to provide a simple and efficient power truck for use in charging furnaces and for similar purposes where a load is to be carried by means projecting from the truck and which is raised and lowered to pick up the load and deposit it for use respectively. In order to enable the truck to thus pick up its load and deposit it, we provide a pivotally mounted rearwardly projecting load carrier which is adapted to be brought beneath the load and then swung upwardly on its pivot to raise the load free from its support, after which the load is transported and deposited by a lowering operation of the load supporting member. The load supporting member is pivotally carried by the truck frame and is operated by a toggle mechanism, moved by a motor and suitable gearing. The invention is hereinafter more fully explained in connection with an illustrative embodiment shown in the drawings and the essential features are summarized in the claims.

In the drawings, Figure 1 is a side elevation of the truck in position ready to receive the load, the carrying position being indicated in broken lines; Fig. 2 is a plan of the truck; Fig. 3 is a rear end view of the truck; Fig. 4 is a sectional side elevation of the mechanism for operating the raising toggle; Fig. 5 is a sectional elevation at right angles to Fig. 4 on a smaller scale and showing the motor and worm drive; Fig. 6 is a detached side elevation of the electric switch and its hand and automatic controlling mechanisms.

As shown in Fig. 1, 10 indicates the frame or body of the truck which is supported by rear wheels 11 and a pair of forward wheels 12. These forward wheels are on opposite sides of a front housing 13 composed of upright and transverse members secured to the frame bars 10. This housing carries a suitable motor 14 for driving the front wheels and has a space 15 above for a storage battery. The front wheels are steered in any suitable manner, as indicated by the steering lever 16. The construction of the frame, wheels, motor, etc., already described does not enter into the present invention. They may be formed, if desired, according to Patent No. 1,260,145, granted March 19, 1918, to The Elwell-Parker Electric Company as assignee of Clyde E. Cochran.

The load supporting member of the present invention is a skeleton platform composed of longitudinal structural beams 20 connected by cross braces and pivoted at their forward ends to the rear face of the housing 13. As shown there are three of these beams 20. The cross braces are shown as angle bars 21 on the under side of the beams, a plate 23 on the upper side, and an angle bar 24 on the upper side, surmounting the plate. Each beam is provided at its forward end with an eye block 25 which embraces a shaft 26. This shaft is mounted in the ears of suitable brackets 28 secured to the rear face of the housing.

The skeleton platform described is supported intermediate of its ends by a toggle system. This is shown as comprising links 30 pivotally mounted by means of a shaft 31 on a bracket 32 carried by the truck frame 10, and links 34 pivotally connecting the upper ends of the links 30 with the skeleton platform. These links 34 are shown as lying outside of the links 30 and as mounted at their lower ends on a shaft 35 occupying eyes in all of the links. The upper end of each link 34 is formed with an eye embracing a corresponding short shaft 37 which is journaled in a bifurcated block secured to the angle bars 21. The links 34 are intermediately braced by distance sleeves 40 between them and bolts 41 passing through the links and occupying the sleeves.

It will be understood from the description given that the skeleton platform may be raised by moving the toggle joint forwardly or lowered by a reversed movement. To cause such raising and lowering, we connect a push-and-pull rod with the shaft 35 of the toggle joint. This rod is shown as comprising an eye piece 45 embracing the shaft 35 between the links 30 and having a shank 46 which extends into and is connected with a coupling sleeve 47. Entering the other end of the sleeve is a rod 48 which is operated by the motor and gearing to push or pull on the toggle joint.

This motor and gearing may be constructed as set out in the patent referred to and such is the construction shown in Figs. 4 and 5. This will now be briefly described.

The push-and-pull rod 48 extends into a housing 60 which is provided with trunnions 61 pivoting to frame brackets 62 carried by the motor frame. Within this housing the rod carries an external screw thread 63. Surrounding this thread and journaled in the housing is a nut 64 which carries worm teeth 65. These teeth mesh with a worm 66 on a shaft alined with and engaging the armature shaft of the motor 67. Accordingly this motor, by rotating the wormwheel-nut, may screw the shaft 48 in one direction or the other, as required, while when the motor is stationary the system is locked and the platform held accordingly.

To prevent damage to the parts in case the platform should be brought to a stop in either direction while the motor is still running there is provided a slip connection between the worm teeth and the nut. This is accomplished by making these worm teeth on a ring separate from the nut but surrounding it and held to it frictionally. To effect the frictional holding there is provided a ring 70 overlapping the nut and the ring carrying the worm teeth and drawn toward these parts by springs 71 surrounding bolts 72 extending through them. A suitable ball bearing 73 may be provided to take the thrust of the worm wheel nut. The casing 60 is preferably made separable, as indicated by the removable portion 75, to allow access to the interior. This interior is packed with grease, which is retained in place by the stuffing box 76 surrounding the rod 48.

The truck shown may be used for various purposes where it is desired to back the truck to bring the load carrier beneath the load and then raise it from the support and transport it and afterward deposit it. An illustration of such use is in the charging of furnaces. The drawing illustrates conventionally at A a suitable load and at B a support therefor. The truck is backed to cause the load carrier 20 to project beneath this load and then the straightening of the toggle raises the load carrier sufficiently to lift the load to clear its support. Suitable means are provided on the load carrier to prevent the load shifting. As shown these consist of the cross brace 24, already referred to and upwardly turned members 29 on the rear ends of the arms 20. As shown the two outermost arms 20 are channel beams facing outwardly while the intermediate member is preferably composed of a pair of channel beams back to back.

It is desirable that a movement of the skeleton platform in either direction be initiated by hand but that such movement be automatically stopped after a certain amount thereof. To effect this, we provide the mechanism shown in Figs. 1 and 6. As there shown 80 indicates a suitable double pole, double throw switch and 81 a spring controlled detent device adapted to hold it against accidental displacement from neutral position (as shown in Fig. 6) and tending to bring it into this position when it clears either extreme position. The detent device comprises a roller on the arm 81 adapted to bear against a notched collar 83 on the central member carrying the switch blades, the arm being forced in this direction by the tension spring 82. The switch is operated by a link 84 which is connected with a bell crank 85, from the other arm of which extends a link 86 provided with an operating handle 87. A push or pull on this handle will shift the switch from neutral position to raising or lowering position as desired.

To automatically operate the switch we provide a third arm 90 for the bell crank 85 which arm carries a sleeve 91 loosely embracing a rod 92 between stops 93 and 94 adjustably positioned thereon. This rod is connected (as shown, through a rock arm 95) with a rod 96 leading to an ear 97 on the under side of the eye-fitting 45 which embraces the toggle knuckle 35.

When the platform is down, as shown in full lines in Fig. 1, the switch mechanism is in the position shown in Fig. 6 and the switch may be neutral as shown in that figure. Then a pull on the handle 87 draws the rod 84 downward and swings the lower switch blades 80 into engagement with their contacts to direct current to the motor 67 in the direction to pull on the screw rod 48 and raise the load. As the toggle straightens in this operation the resulting push on the rod 96 pushes the rod 92 forwardly, and as the desired elevation has been reached the adjustable collar 94 on the rod 92 engages the sleeve 91 and pushes it forwardly, shoving upwardly on the link 84 and swinging the lower knife blades out of engagement with their contacts. This stops the elevation, and the load remains stationary, with the toggle substantially straight and forming a strut and held by the self locking driving gearing.

To lower the load the operator pushes on the handle 87 which thus swings the upper knife blades into engagement with their contacts. This rotates the motor in the reverse direction and the nut pushing outwardly on the screw rod 48 gradually folds the toggle, the weight of the load assisting the movement, until the load comes into its desired lower position. During this lowering position the rearward travel of the eye block 45 pulls on the rods 96 and 92 to cause the collar 93 to engage the sleeve 91 and thereby rock the bell crank 85 and swing the knife switch back into neutral position.

If desired an automatic magnetic brake may be provided on the armature shaft for stopping its rotation instantly when the current is shut off. The exterior of such brake is indicated at 100 in Fig. 5 and a suitable construction thereof is described in the patent referred to.

Having thus described our invention what we claim is:—

1. The combination of a truck having a frame, a front housing and supporting wheels, a load carrying device pivoted at its forward end to the front housing, and overhanging the rear of such frame, a toggle pivoted to the truck frame and to an intermediate part of the load carrying device, means for straightening the toggle, and power mechanism carried by the front housing for operating said means.

2. The combination of a truck having a frame and supporting wheels, a substantially horizontal load carrying platform some distance above the frame to the rear wheels, said platform being pivoted to an elevated portion of the truck frame, a toggle pivoted to the truck frame adjacent to the rear wheels and to the load carrying platform and when straight standing substantially vertically between them, a rod for moving the knuckle of the toggle, and mechanism carried by the truck frame for operating the rod.

3. The combination, with an automobile truck, having a front housing, a rear frame extending from the lower portion of the housing and wheels supporting the structure, of a load carrier pivoted adjacent to the rear of the housing and extending rearwardly beyond the end of the truck frame, a toggle between the rear frame and the load carrier, pivoted at its lower end to the truck frame and at its upper end to the load carrier, and mechanism for applying power to shift the knuckle of the toggle.

4. The combination, with a truck having supporting wheels, a front housing and a rear frame extending from the lower portion of the housing, an approximately horizontal load carrier pivoted to the rear face of the housing some distance above said rear frame, said load carrier extending beyond the rear frame, a toggle joint comprising links pivoted to the upper side of the rear frame and the lower side of the load carrier respectively and connected by a knuckle shaft, a longitudinally movable member engaging such shaft, and mechanism for moving said member longitudinally.

5. The combination of a truck, having a front housing, a rear frame extending from the lower portion of the housing, and supporting wheels, an approximately horizontal load carrier, pivoted to the rear face of the front housing and extending rearwardly beyond the truck, a toggle joint between the rear truck frame and the load carrier, comprising a pair of links pivoted to the truck frame, a pair of links pivoted to the load carrier, a shaft connecting the two pairs of links, a rod adapted to move said shaft, a pivotally mounted casing into which the rod extends, and means carried by the casing for moving the rod longitudinally.

6. The combination of a truck, having a front housing, a rear frame extending from the lower portion of the housing, and supporting wheels, an approximately horizontal skeleton platform composed of bars pivoted at the front ends to the rear face of the front housing and extending rearwardly beyond the truck, cross braces connecting said bars, means on the bars for preventing the load shifting longitudinally, a toggle joint between the rear truck frame and the platform adapted to be upright when straightened, a pull rod adapted to straighten the toggle, and means for moving the rod longitudinally.

7. The combination of a truck frame, a load carrier pivoted thereto, a toggle joint between the truck frame and the load carrier, an electric motor, mechanism operated thereby for straightening the toggle, a switch for controlling the motor, and switch-operated mechanism connecting the switch with one of the parts of the movable toggle mechanism.

8. The combination of a truck, having a front housing, a rear frame, extending from the lower portion of the housing, and supporting wheels, an approximately horizontal load carrier, pivoted to the rear face of the front housing and extending rearwardly beyond the truck, a toggle joint between the rear truck frame and the load carrier, an electric motor, mechanism operated thereby for straightening the toggle, a switch for controlling the motor, switch-operating mechanism connecting the switch with one of the parts of the movable toggle mechanism, and a manual device for positioning said switch to start the motor in either direction.

9. The combination of a truck, a load carrier pivoted thereto, a toggle connecting the truck frame and load carrier, means connected with the knuckle of the toggle, an electric motor for operating said means, a double throw switch for controlling the motor to cause its rotation in either direction, mechanism for moving the switch connected to it and to the toggle device, said mechanism having loose-play at one point and a manual device connected to said mechanism between the loose-play point and the switch and adapted to operate the switch independently of the connection to the toggle.

10. The combination of a truck frame, a load carrier pivoted thereto, a toggle device connected with the knuckle of the toggle, an electric motor for operating said device, a double throw switch for controlling the motor to cause its rotation in either direction, mechanism for moving the switch including a bell-crank having an eye, a rod slidable loosely through the eye and having stops some distance on either side of the eye, said rod being connected with the toggle device, and a manual device having a rod connected with the bell crank and adapted to operate the switch independently of the connection to the toggle.

MORRIS S. TOWSON.
CLYDE E. COCHRAN.